Figure 1:
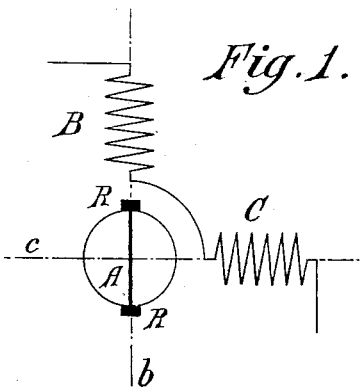

V. A. FYNN.
ALTERNATE CURRENT MOTOR.
APPLICATION FILED JULY 20, 1905.

946,502.

Patented Jan. 11, 1910.
3 SHEETS—SHEET 1.

WITNESSES:
Fred White
René Nuine

INVENTOR:
Valère Alfred Fynn,
By his Attorneys
Arthur C. Fraser Novia

V. A. FYNN.
ALTERNATE CURRENT MOTOR.
APPLICATION FILED JULY 20, 1905.
946,502.
Patented Jan. 11, 1910.
3 SHEETS—SHEET 3.
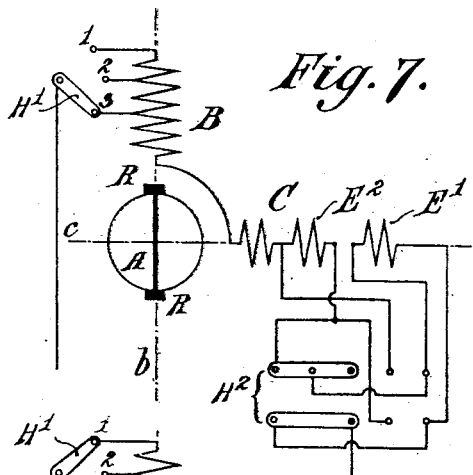
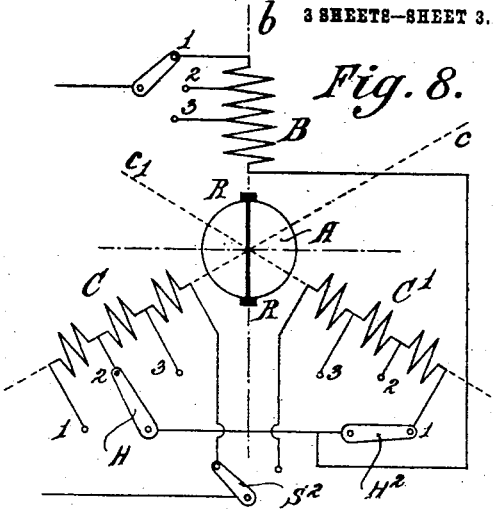
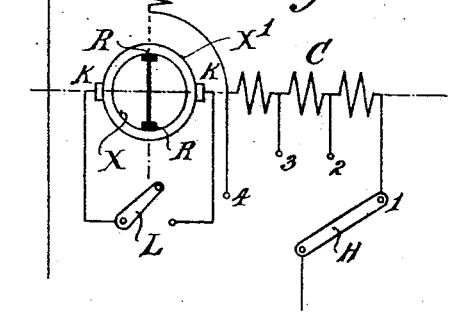
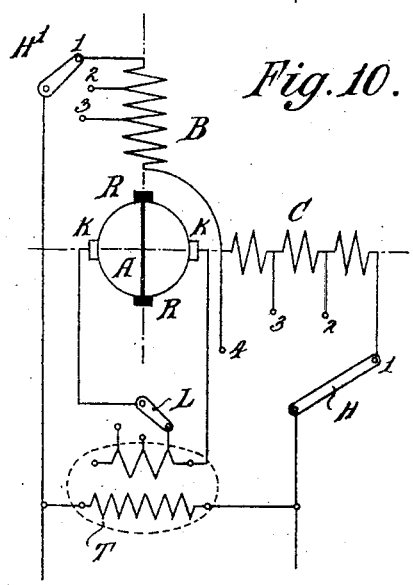
WITNESSES:
Fred White
René Bruine
INVENTOR:
Valere Alfred Fynn
By his Attorneys
Arthur C. Fraser & Usina

UNITED STATES PATENT OFFICE.

VALÈRE ALFRED FYNN, OF LONDON, ENGLAND.

ALTERNATE-CURRENT MOTOR.

946,502.   Specification of Letters Patent.   Patented Jan. 11, 1910.

Application filed July 20, 1905. Serial No. 270,462.

*To all whom it may concern:*

Be it known that I, VALÈRE ALFRED FYNN, of 57 Chancery Lane, London, England, electrical engineer, have invented certain new and useful Improvements in Alternate-Current Motors, of which the following is a specification.

The present invention relates to alternate current motors which start and work as repulsion motors or only start as such.

The object of the invention is to shift the axis of the resultant stator field in a novel way to any desired extent with respect to the axis of the repulsion brushes, and in such a manner that not only a gradual starting of the motor under the most favorable conditions can be thereby attained, but also favorable speed regulation, and, when desired, a very gradual transition from the working as a repulsion motor to the working as an induction motor, and without the help of external apparatus such for instance as transformers, induction regulators and the like.

It is to be understood that the term "repulsion" motor is here throughout used to describe a "series induction motor" whereas the term induction motor stands for a "shunt induction motor." For both these induction motors the axis of the repulsion brushes is in reality the armature axis and that axis which is approximately displaced by $\frac{180}{n}$ degrees with respect to the former is in reality the field axis. Throughout this specification the letter "$n$" stands for the number of poles.

Generally stated these objects are attained by subdividing the stator winding into two or more elements disposed along at least two axes which must be displaced with respect to each other; all, or any desired number of elements positioned in such manner are connected up in two groups in series relation in such a manner that the resultant magnetic axis of the one group coincides with the axis of the repulsion brushes while the resultant magnetic axis of the other group forms an angle with the axis of the repulsion brushes. These two resultants of the respective groups are the components of the resultant magnetic axis of the system. According to this invention the position of this resultant magnetic axis of the system is shifted with respect to the stationary axis of the repulsion brushes by varying the proportion of the useful or effective turns of the two groups to each other. The proportion of the useful or effective turns of the two groups to each other can be varied in different ways. The effective turns of the one group can be either gradually increased or decreased with respect to the turns of the other group; or while the turns in the one group are increased, those in the other group can at the same time be decreased; this can be effected by switching in additional turns or cutting out turns or by varying the grouping of the existing turns or part of them, for example by connecting them at first all in series, then partly in series and partly in parallel, and finally all in parallel, this last method permits of the most favorable utilization of the copper in use and would be most suitably employed for speed regulation.

Figure 2:
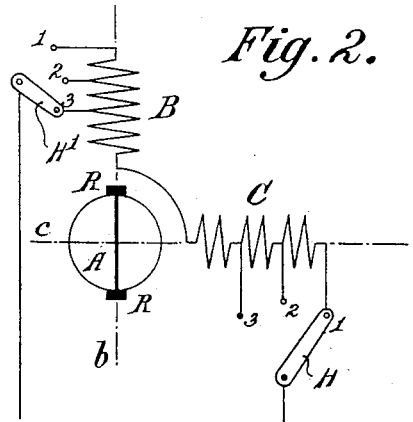
Figure 3:
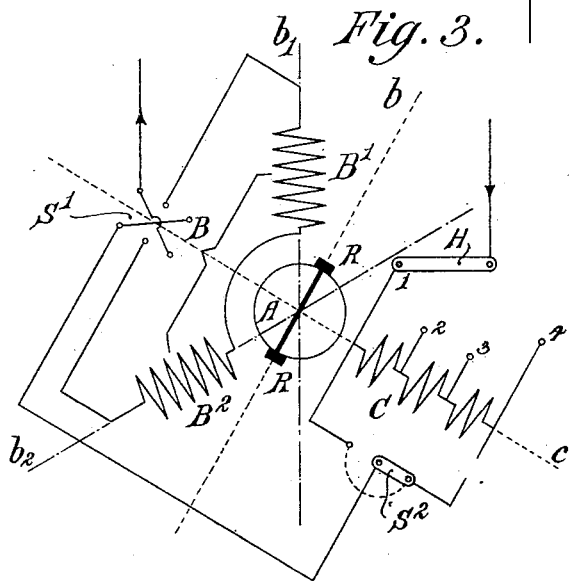
Figure 4:
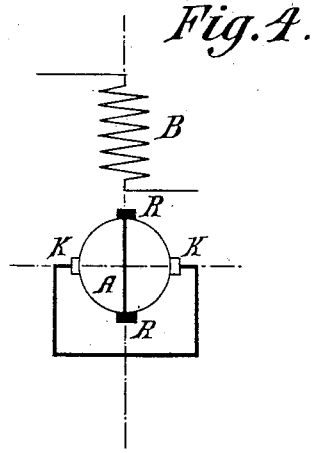
Figure 5:
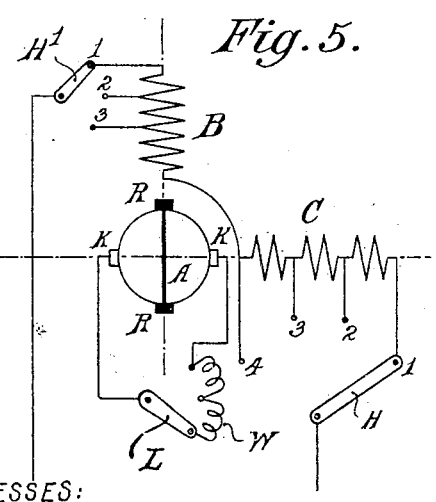
Figure 6:
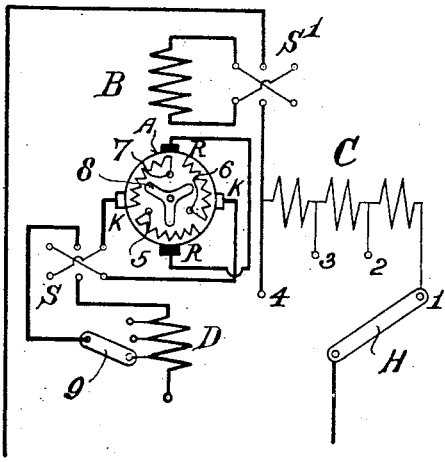

In the accompanying drawings:—Figure 1 is a diagram showing an ordinary repulsion or series induction motor. Fig. 2 shows Fig. 1 with part of the invention applied thereto. Fig. 3 represents a motor of the same type as Fig. 2 but having a stator winding divided into three elements disposed along axes displaced by 120 electrical degrees. Fig. 4 represents an ordinary single-phase shunt induction motor. Fig. 5 shows a motor similar to Fig. 2 but with the addition of means for converting the machine from a series to a shunt induction motor. Fig. 6 shows a motor similar to Fig. 5 but with the addition of means comprised within the motor for fully compensating the motor after it has been converted into a shunt induction machine. Fig. 7 shows a motor similar to Fig. 2 but with modified means for regulating the field winding C. Fig. 8 shows a motor similar to Fig. 3 but where two elements only out of three are made use of at one time. Fig. 9 shows a modified construction of the motor shown in Fig. 5 and in which the rotor is provided with two separate windings. Fig. 10 shows a motor similar to Fig. 6 but where the compensating means are external to the motor and easily regulated.

The points to be taken into consideration are the same for all the modifications, as will be clear from the following example shown in Fig. 1 where I take a bipolar, so called, repulsion motor the stator winding of which consists of a number of elements disposed along two axes $b$ $c$ which are displaced with respect to each other to 90 electrical degrees. All the elements along one axis are joined up to form one group.

A represents the armature of the rotor which is provided in the known way with a winding connected to a commutator on which rest the short circuited brushes R R.

B and C indicate the two groups of the stator winding. The elements of each group are, in this case, all co-axial; the resultant magnetic axis of each group will therefore coincide with the axis of the individual elements forming that particular group and the resultant magnetic axes of the two groups will consequently also be displaced toward each other by 90 electrical degrees. The resultant magnetic axis $b$ of the one group B coincides with the repulsion brush axis R R; the resultant magnetic axis $c$ of the other group C is perpendicular thereto. If the ampere turns in B are a maximum and those in C equal to $nil$, the motor does not move, but takes much current, since it works as a transformer with short circuited secondary in consequence of the short circuited brushes R R. If C is a maximum and B equal to $nil$, the motor does not move, but takes little current (only magnetizing current) since it works as a transformer with open secondary circuit. In the first case the resultant magnetic axis of the system coincides with the resultant of group B; in the second case it coincides with the resultant of group C.

The motor can only develop a torque when the resultant magnetic axis of the system forms with the axis of the repulsion brushes an angle greater than zero and less than 90°. This indicates the relative proportions to be chosen for the two groups of windings on the stator. Further the greater the number of windings which are connected in series the less will be the current which the motor will take at a given voltage. This method thus allows of reducing the strength of the current taken by the motor when first connected to the mains to a value as small as desired, while avoiding the necessity for any external aids such as starting resistances, starting transformers and the like; further it possesses the very important advantage that the whole of the energy taken from the mains is usefully applied to the production of torque, since each ampere turn assists in increasing the resulting magnetic field of the system and since it has been shown to be easy to suitably choose the direction of said field. In describing the action of such a motor, according to another theory, it may be said that the B group induces a current in the short circuited rotor A, substantially in phase with, but opposite in direction to, the current in the B group. The current in the C group is (on account of the series connection) necessarily in phase with the current in B, and since current and field due thereto are always in phase, a torque will result between the current in A and the field produced by C. Adopting this view of the action of the motor, and which corresponds to the more correct term "series induction motor," it will be seen that every ampere turn in B increases the current in A and every ampere turn in C increases the strength of the field, so that all the energy taken from the mains is usefully applied; we are thus led to the same conclusion as before.

A form of the invention which can be used with good practical results consists in leaving the group B unchanged, but employing so many turns for group C that the starting current is sufficiently reduced, and then gradually reducing the number of turns in C until the relation thereof to the number of turns in B is brought to the most suitable value for the working of the motor. It may however in some cases be desirable to regulate the number of turns in both groups, and such an arrangement is shown by way of example in Fig. 2 where levers H and $H^1$ serve to reduce the number of turns of groups C and B respectively by switching off more or less of the turns. If the motor is to take as little current as possible when first connected to the mains, the regulating levers H $H^1$ should stand on the points marked 1 in each group so as to include as many turns across the mains possible. By decreasing the number of turns in one or both groups the current taken by the motor will increase, and if the motor is already running, its speed and torque will also increase.

It will be clear that one of the regulating levers, for instance $H^1$, may be entirely omitted and the group C alone regulated. As already stated an economy of material and space can be effected by employing for instance the C turns or a part of them first all in series and finally all in parallel. This is illustrated in Fig. 7 where a double pole two throw switch $H^2$ is employed for the purpose of connecting two of the elements $E^1$ $E^2$ of the group C first in series and then in parallel. In other respects Fig. 7 is the same as Fig. 2. Reversal of the direction of rotation is effected by reversing the direction of current in B or C, but preferably in B.

A form of the invention where the stator winding consists of two groups wherein the elements of each group are however not all coaxial is illustrated in Fig. 3. The group B is here formed of elements $B^1$ $B^2$ disposed along the axes $b^1$ and $b^2$ of which $b$ is the resultant magnetic axis, in the example chosen this axis is made to coincide with the repulsion brush axis R R. The second group C is composed of coaxial elements and is disposed along the axis $c$. The component parts of this stator winding occupy the same relative positions as the component parts of an ordinary three phase winding, they are however differently connected. The three axes $b^1$ $b^2$ and $c$ along which the elements of the two groups are disposed are displaced by 120 electrical degrees from each other. Means for reversing the direction of rotation are shown in this figure, thus the switch $S^2$ allows of the direction of rotation being reversed by reversing the current through the group C and the switch $S^1$ by reversing the current through the group B. Starting can be effected in precisely the same way as in Fig. 2 by reducing for instance the number of turns in one of the groups, preferably of the group C.

If in either of the above examples this arrangement is also employed for regulating the speed of rotation, then the sub-divisions or the stepping of the groups B or C and the section of the wire used should be correspondingly chosen. I may in some cases provide the stator with three groups of windings two only of which are operative at one time, the direction of rotation depending on which two of the three groups are in operation. The three groups may for instance be disposed along axes displaced by 120 degrees as shown in Fig. 8 where B, C and $C^1$ are the three stator groups, the axis of the repulsion brushes should preferably coincide with the axis of that group B which is always in use. The switch $S^2$ serves to put into circuit either the group C or $C^1$ which are regulated by the levers H and $H^2$. This method of starting and operating a motor of the type herein referred to makes it unnecessary to use resistances or the like between the repulsion brushes, but does not of course preclude the well understood use of such modifications. This shifting of the resultant axis of the system can further be utilized with a motor which starts as a repulsion motor to secure a gradual transition from the working as a repulsion motor to the working as an induction motor, while retaining the gradual, powerful and efficient starting properties. To make it quite clear how the invention can be used for this purpose, it is best to refer to the known primary form of the single phase induction motor as shown in Fig. 4. It consists of two short circuited sets of brushes displaced to 90 electrical degrees with respect to each other and one of which is coaxial with the stator field axis. Such a motor does not start by itself, but when by some means or other it has been brought up to a speed somewhat approaching the synchronous it will run on and reach and maintain an approximately synchronous speed.

Fig. 5 shows the combination of Fig. 2 with Fig. 4. At starting, I leave the brushes K K open. With the aid of the lever H or $H^1$ or both, and in the manner already described the motor is brought to the desired speed, this may be for instance one half to two-thirds of the synchronous, the circuit of the brushes K is then closed by means of the switch L, and this can be done directly or gradually, for example over resistances W as shown. So long as the resultant magnetic axis of the system makes an angle with the axis of the brushes R R which are used for starting as a repulsion motor and while the circuit of brushes K is closed, the motor runs partly as a repulsion or series induction and partly as a shunt induction motor, and its action is not satisfactory for some purposes. By gradually displacing the resultant further until it coincides with the brushes R R while keeping the K circuit closed, a gradual transition to the purely shunt induction working is attained, and the output of the motor is considerably increased without any noticeable shock or disturbance to the system. The higher the resistance in use, the sooner after the start may the circuit of the brushes K K be closed, this may even be done when the motor is at rest, provided the resistance is sufficiently high. Instead of resistances, counter E. M. F.'s may be employed, which can also serve for compensation or in other words for improving the power factor as described in my United States Patent No. 777,198; these E. M. F.'s may be taken from the motor itself as shown in Fig. 6 or directly from the mains, as shown in Fig. 10 suitable transforming means being employed if necessary. The higher these counter E. M. F.'s the sooner can the K circuit be closed; as the motor gathers speed these E. M. F.'s must be reduced, otherwise the motor will be over compensated. The direction of rotation is changed as before. If a compensating E. M. F. is employed the direction thereof must also be altered when changing the direction of rotation.

Such a compensated motor adapted for running in both directions, and wherein the compensation is obtained from an auxiliary winding D disposed on the motor itself, is illustrated by way of example in Fig. 6, in which the same reference letters are employed. The reversing switch for the K circuit is shown at S and the reversing switch for the stator group B is shown at $S^1$. The regulating lever $H^1$ is omitted, but may be added if required. As soon as the field axis of the system coincides with the axis of the brushes R R used for starting, the motor works as a pure shunt induction motor, and the whole rotor current must go through the brushes. This would necessitate a relatively large commutator for permanent running; in order therefore to relieve the commutator of load the rotor winding can be entirely short-circuited, or, which amounts to the same thing, two or more symmetrically situated points thereof may be short-circuited in the known way. By saying that symmetrically situated points of the rotor winding are to be short-circuited I do not of course refer to points of equal potential, connecting these would not produce a short circuit, but I refer to points such as would be chosen if single or polyphase currents were to be derived from the rotor winding. In Fig. 6 is shown one example of such means for short-circuiting suitably situated points of the rotor winding. The rotor in that figure carries a continuous current winding connected to the commutator and represented by the circle upon which the brushes rest; also a three-phase winding provided with the terminals 5, 6 and 7. These two windings are interconnected in the manner described in my U. S. P. 777,198. The three points to be short-circuited are indicated at 5, 6 and 7, and the shortcircuiting device is shown as consisting of a star-shaped body 8 of high conductivity and capable of rotation about the axis of the rotor to the extent necessary to bring it into simultaneous electrical contact with the three conductors at 5, 6 and 7. Nothing is thus altered in the action of the motor, the commutator is only relieved of the necessity of carrying a heavy current; the machine continuing to run as before as a pure shunt induction motor. All that can happen by this subsequent short circuiting is that the resistance of the rotor will be reduced because of the transition resistance at the brushes being avoided and this may cause a very slight increase in speed. When compensation is employed, a rotor winding of the kind described in my United States Patent No. 777198 can be used with advantage. Such a winding is shown in Fig. 6. It is clear that similar, if not so perfect results, are obtained in case the resulting magnetic axis of neither stator winding group coincides exactly with the axis of the brushes used for starting and to which I have referred throughout as repulsion brushes.

Fig. 9 shows another such arrangement as Fig. 5 but where the rotor is provided with two separate windings X and $X^1$. The winding X is permanently short-circuited by the repulsion or armature brushes R R, and the winding $X^1$ can be short-circuited by means of the field or auxiliary brushes K K and the switch L.

In Fig. 10, which is similar to Fig. 5, the compensating E. M. F. is derived from a transformer T connected in parallel to the supply and the secondary of which is connected to the field brushes K K. The switch L enables the voltage applied to the brushes K K to be regulated.

The arrangements and constructions hereinbefore described with reference to bipolar motors can be applied in the known way to multipolar motors as will be understood without further explanation; and further they are independent of the kind of stator and rotor windings employed.

I do not desire to limit myself to the particular constructions and arrangements of parts here shown, since changes therein which do not depart from the spirit of the invention will be obvious to those skilled in the art.

What I claim and desire to secure by Letters Patent is:—

1. An alternate current motor comprising the combination of a rotor wound with a direct current winding, a commutator connected to said winding, repulsion brushes on said commutator, auxiliary brushes on said commutator displaced by 90 electrical degrees with regard to the repulsion brushes, means for short-circuiting said auxiliary brushes, a stator having two groups of windings connected in series relation and displaced with respect to each other, the axis of one group approximately coinciding with the axis of the repulsion brushes, and a switch for varying the number of effective turns of one group of stator windings.

2. An alternate current motor comprising the combination of a rotor wound with a direct current winding, a commutator connected to said winding, repulsion brushes on said commutator, means for impressing a compensating E. M. F. on the rotor along an axis displaced from that of the repulsion brushes, a stator having two groups of windings connected in series relation and displaced with respect to each other, the axis of one group approximately coinciding with the axis of the repulsion brushes, and a switch for varying the number of effective turns of one group of stator windings.

3. An alternate current motor comprising the combination of a rotor with a direct current winding, a commutator connected to said winding, repulsion brushes on said commutator, a stator having two groups of windings connected in series relation and displaced with respect to each other, the axis of one group approximately coinciding with the axis of the repulsion brushes, a switch for varying the number of effective turns of one group of stator windings, and means for impressing on the rotor along an axis displaced from that of the repulsion brushes a compensating E. M. F. derived from the stator.

4. An alternate current motor comprising the combination of a rotor wound with a direct current winding, a commutator connected to said winding, repulsion brushes on said commutator, auxiliary brushes on said commutator displaced by 90 electrical degrees with regard to the repulsion brushes, means for short-circuiting said auxiliary brushes, means for short-circuiting a number of points of the rotor windings independently of the commutator, a stator having two groups of windings connected in series relation and displaced with respect to each other, the axis of one group approximately coinciding with the axis of the repulsion brushes, and a switch for varying the number of effective turns of one group of stator windings.

5. An alternate current motor comprising the combination of a rotor wound with a direct current winding, a commutator connected to said winding, repulsion brushes on said commutator, means for impressing a compensating E. M. F. on the rotor along an axis displaced from that of the repulsion brushes, means for short-circuiting a number of points of the rotor windings independently of the commutator, a stator having two groups of windings connected in series relation and displaced with respect to each other, the axis of one group approximately coinciding with the axis of the repulsion brushes, and a switch for varying the number of effective turns of one group of stator windings.

6. An alternate current motor comprising the combination of a rotor wound with a direct current winding connected to a commutator and also with an alternate current winding, repulsion brushes on said commutator, means for impressing a compensating E. M. F. on the rotor along an axis displaced from that of the repulsion brushes, means for short-circuiting a number of points of the alternate current rotor winding, a stator having two groups of windings connected in series relation and displaced with respect to each other, the axis of one group approximately coinciding with the axis of the repulsion brushes, and a switch for varying the number of effective turns of one group of stator windings.

7. An alternate current motor comprising the combination of a rotor wound with a direct current winding, a commutator connected to said winding, two sets of brushes on said commutator disposed along different axes, means for short-circuiting one set of brushes, means for impressing a compensating E. M. F. on the other set of brushes, a stator having two groups of windings connected in series relation and displaced with respect to each other, and a switch for varying the number of effective turns of one group of stator windings.

8. An alternate current motor comprising the combination of a rotor wound with a direct current winding connected to a commutator and with an alternate current winding, two sets of brushes on said commutator disposed along different axes, means for short-circuiting one set of brushes, means for impressing a compensating E. M. F. on the other set of brushes, means for short-circuiting a number of points of the alternate current winding, a stator having two groups of windings connected in series relation and displaced with respect to each other, and a switch for varying the number of effective turns of one group of stator windings.

9. An alternate current motor comprising the combination of a rotor wound with a direct current winding connected to a commutator, repulsion brushes on said commutator, auxiliary brushes on said commutator displaced by 90 electrical degrees with respect to the repulsion brushes, a stator having two groups of windings connected in series relation and displaced with respect to each other, the axis of one group approximately coinciding with the axis of the repulsion brushes, a switch for varying the number of effective turns of one group of stator windings, an auxiliary winding on the stator disposed along an axis approximately coinciding with that of the repulsion brushes, and means for connecting said auxiliary stator winding to the auxiliary brushes on the commutator.

10. An alternate current motor comprising the combination of a rotor wound with a direct current winding connected to a commutator and also with an alternate current winding, repulsion brushes on said commutator, auxiliary brushes on said commutator displaced by 90 electrical degrees with respect to the repulsion brushes, a stator having two groups of windings connected in series relation and displaced with respect to each other, the axis of one group approximately coinciding with the axis of the repulsion brushes, a switch for varying the number of effective turns of one group of stator windings, an auxiliary winding on the stator disposed along an axis approximately coinciding with that of the repulsion brushes, means for connecting said auxiliary stator winding to the auxiliary brushes, and means for short-circuiting a number of points of the alternate current rotor windings.

In witness whereof, I have hereunto signed my name in the presence of two subscribing witnesses.

VALÈRE ALFRED FYNN.

Witnesses:
 ALBERT GIRARD BÃLE,
 WILHELM HESS.